June 6, 1950            F. WEISS            2,510,786
WINDING MACHINE
Filed April 10, 1948            4 Sheets-Sheet 1
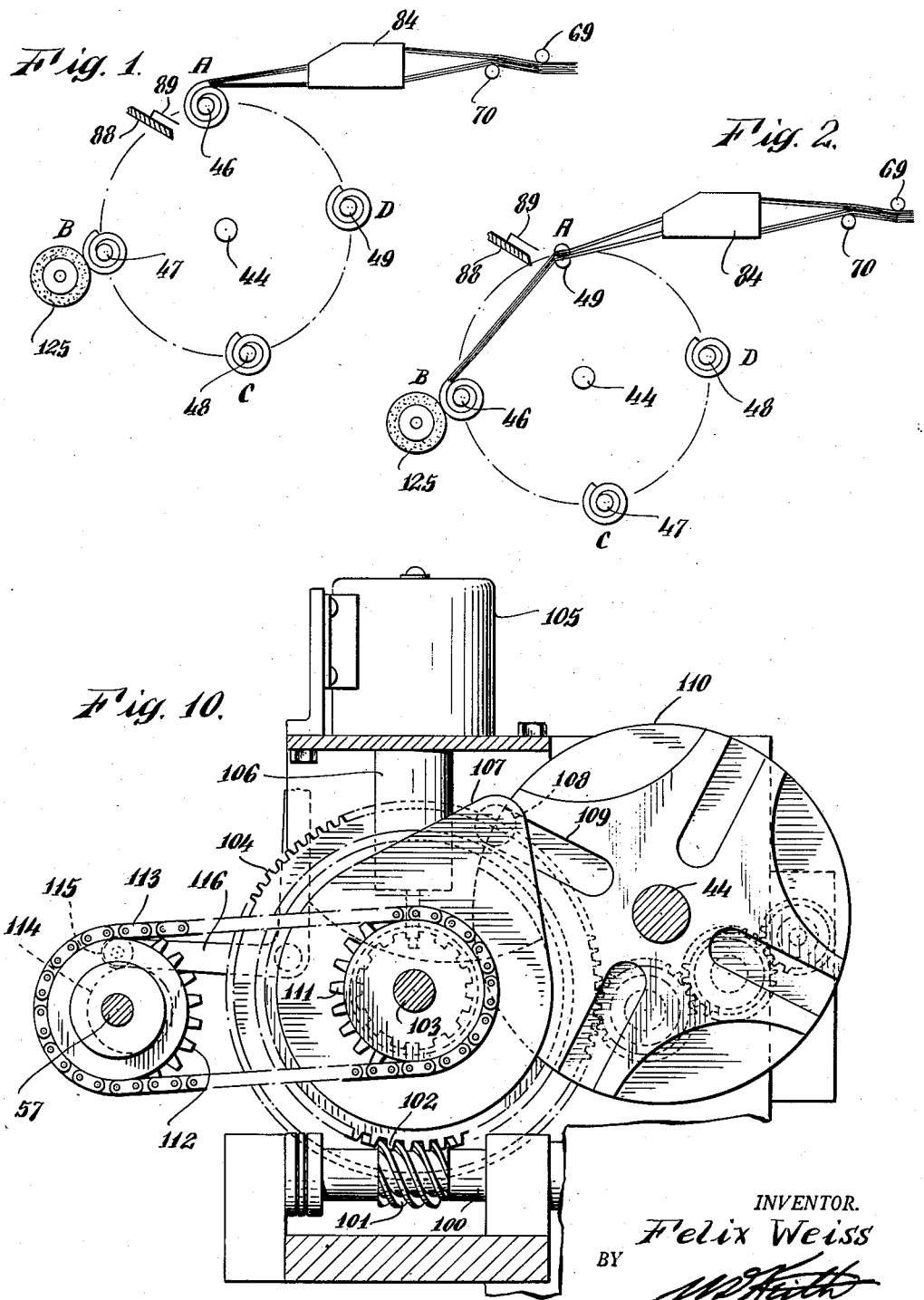
INVENTOR.
Felix Weiss
ATTORNEYS.

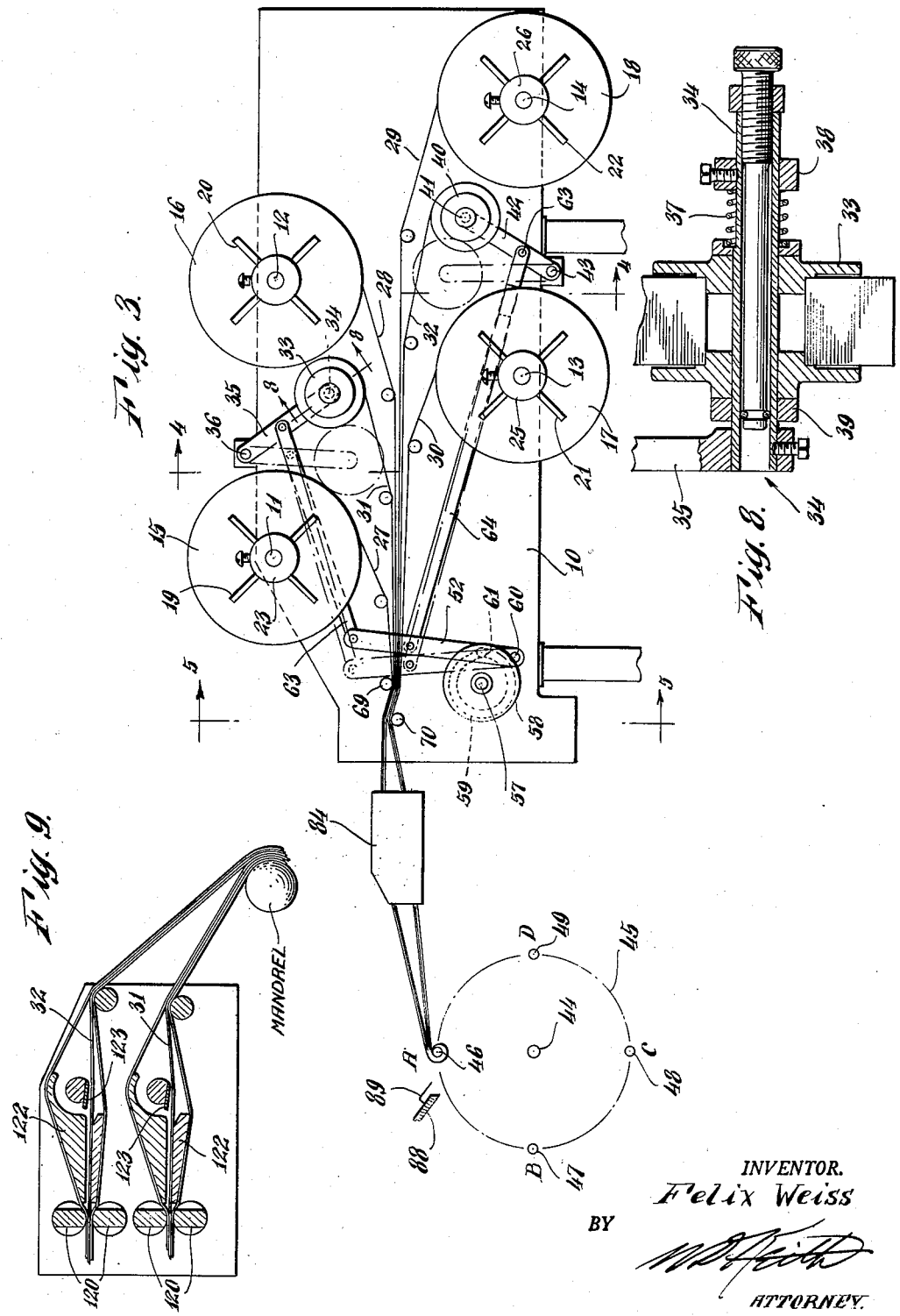

June 6, 1950 F. WEISS 2,510,786
WINDING MACHINE
Filed April 10, 1948 4 Sheets-Sheet 3

INVENTOR.
Felix Weiss
BY
ATTORNEYS

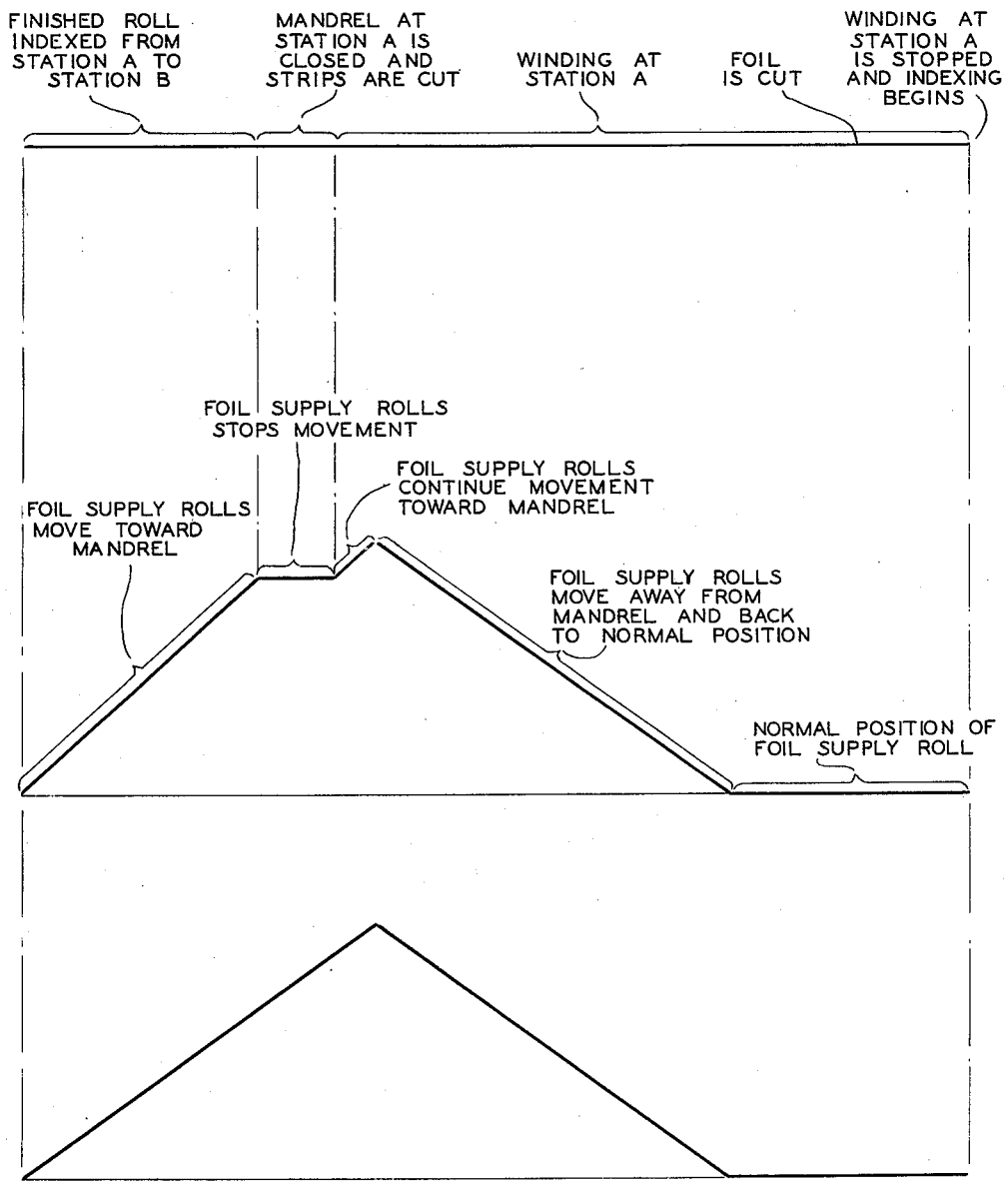

Patented June 6, 1950

2,510,786

UNITED STATES PATENT OFFICE 2,510,786

WINDING MACHINE

Felix Weiss, Brookline, Mass., assignor to Cornell-Dubilier Electric Corporation, South Plainfield, N. J., a corporation of Delaware Application April 10, 1948, Serial No. 20,308

9 Claims. (Cl. 242—56)

This invention relates to machines for making rolls of types such as are used in electrical capacitors for condensers. Such roll winding machines are usually semi-automatic or automatic in operation and are driven by power or by hand. The present invention is directed to improvements in such machines but is particularly directed to the problem of winding a series of capacitor rolls of identical electrical characteristics, and therefore its principles find increased application in winding machines of the multi-mandrel type which are designed to quickly produce large quantities of such capacitor rolls. Good examples of such machines are described in United States Patent No. 2,333,570 and No. 2,384,983. During the operation of such machines a winding mandrel is attached to the end of spooled supplies of insulating strips, such as paper, and of metallic foil strips. The strips are interleaved in desired relationship, and means are provided to maintain at least a slight tension on the strips during the winding operation so that as the strip passes from the supply spool to the mandrel, it will remain straight and flat. Near the end of such a winding operation the elements of the machine operate to first cut the foil strips, to then provide a space between the cut foil ends, and to, thereafter, cut the paper strips in the space between the separated foil ends. These sequential operations demand a positive, yet careful, handling of the very thin foil strips since it is highly desirable that the foil be not wrinkled, crushed or otherwise distorted during the feeding and winding operations. It is likewise important to the production of a series of rolls of substantially identical electrical characteristics that the amount or length of foil strip cut and wound into each roll be substantially that which is cut and wound into a succeeding or preceding roll. It is also desirable that each foil strip be so positioned with respect to the somewhat longer strips of paper with which it is interleaved during winding as to insure that the foil strip ends are amply overlapped by the paper strip ends. The general objects of this invention include the provision of means which will insure that the foil strips are smoothly fed to the winding and cutting operations and are fed at such rate that each foil strip cut during each succeeding winding operation is substantially identical in length.

The principles of the invention and a preferred embodiment thereof are described herein with reference to a multi-mandrel machine of the type described in the aforesaid Patent No. 2,384,983. Therefore, the machine shown in the drawings is shown only to the extent necessary to explain the present invention and the operation thereof in connection with such a machine. Further details as to the basic operation and specific mechanical construction of many parts of the machine will be found in the aforesaid patent. In the attached drawings:

Figs. 1 and 2 are operational diagrams illustrating the sequence and general manner of the winding and cutting actions of such a machine modified to embody the principles of this invention;

Fig. 3 is a front elevation of the multi-mandrel machine specifically illustrating a preferred embodiment of the invention, only such parts of the machine being shown as are necessary to the following description;

Fig. 8 is a detail of a foil strip reel and supporting arm;

Fig. 9 is a vertical section taken through cutter box 84 of Fig. 3;

Fig. 10 is an elevation in section of a portion of the driving mechanism of the machine; and Fig. 11 is a chart showing the relative timing of operations conducted in the machine illustrated in Figs. 3 to 10, inclusive.

Figure 4:
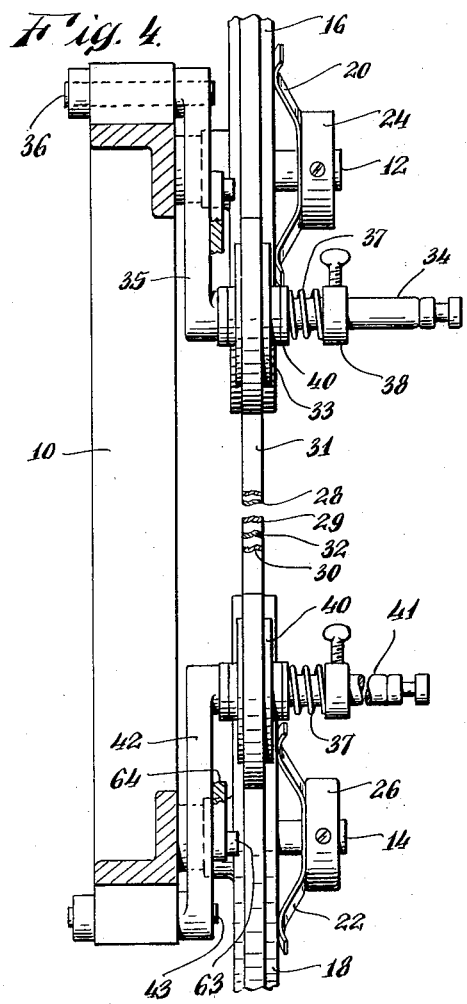
Fig. 4 is a vertical section on line 4—4 of Fig. 3.

To simplify the description of the machine illustrated in the drawings and to specifically bring into focus the particular parts of those operations of the machine to which the present invention is directed, general reference will first be had to Figs. 1, 2 and 3. The machine shown in Fig. 3 includes a front panel 10 on which are rotatably mounted paper supply reels 15, 16, 17 and 18 and foil supply reels 33 and 40. These reels are arranged in such spatial relationship that strips delivered therefrom over and under guide pins 69 and 70, through cutter box 84 and onto a mandrel such as 46 on mandrel turret 45, may be interleaved as desired. Usually, as shown, the foil strips are positioned between the insulation strips. The entire strip advancing force which is used to urge the strips off the supply reels through cutter box 84 and into the form of a wound condenser roll on the winding mandrel is furnished through the winding mandrel. The rotation of the supply spools under the exertion of this force is slightly retarded, as hereinafter more specifically described, so that those reels do not overrun and so that the strips between the mandrel and the reels will remain reasonably taut with no slack or wrinkling. Each winding mandrel 46, 47, 48 and 49 is composed of two parts (as specifically described in Patent No. 2,384,983). The strips are grasped between these two parts of the mandrel when the mandrel is at winding station A, and thereafter winding begins. Near the end of the winding operation foil cutters in cutter box 84 operate to sever the foil strips, and winding then continues for a short space until the severed ends of the foil attached to the mandrel have been drawn apart from the severed ends of the foil from the foil supply reels. The winding action at station A then stops and through motion of indexing shaft 44 turret 45 is indexed to 90° moving the wound mandrel to station B. During this indexing operation the one-part mandrel at station D is indexed to station A where the other part of the mandrel is provided. The parts of the mandrel at station A are closed on the paper strips which now extend from cutter box 84 to the mandrel at station B (see Fig. 2). Immediately thereafter the paper cutting mechanism, composed of knife 88 and pins 89, is operated, the pins 89 first impaling the paper strips and the knife 88 following to sever the paper strips. The winding operation is then again repeated at station A while at station B the wound capacitor roll is rotated against pasting roller 125 to roll up and paste the loose end or "flag" of the capacitor roll. At the end of each successive winding operation the turret mandrel 45 indexes so that a wound capacitor roll is brought to station B for pasting operations, then to station C where one-half of the mandrel is withdrawn to disengage the mandrel from the wound strips and then to station D where the finished roll is swept off the part mandrel leaving that part mandrel free to be advanced on the next indexing of the turret to winding station A.

In general aspect, the operation just described is the operation of the previously described multi-mandrel winding machines except in three important particulars. First, it will be noted that in the operation just described the only advancing force applied to the strips is the direct pull of the mandrel. Second, it will be noted that at the beginning of the winding operation the end of the foil is not engaged in the mandrel. Third, it will be noted that the end of the foil strip supply is advanced to the mandrel solely by frictional engagement of foil strip surfaces with the adjacent and overlying surfaces of the insulating strips which are attached to the mandrel and with which the foil strips are interleaved. Thus throughout the operation of the machine of this invention the foil strips are never sharply bent, nor is any positive force supplied to the surface of any strip such as would cause distortion or wrinkling thereof. It will thus be seen that the improvements to which this invention relates are directed to the handling of the foil strips from the supply reels to the winding station and that the ancillary operations at stations B, C and D remain unmodified.

Referring now to the illustrated mechanism, in the light of the above general description, the insulation, usually paper, feed circuit is as above described, the paper supply reels 15, 16, 17 and 18 being rotatably mounted on panel 10 on fixed pins or axles 11, 12, 13 and 14, respectively. Compression spider springs 19, 20, 21 and 22, respectively, located between these reels and the respective collars 23, 24, 25 and 26 furnish a moderate restraint against free rotation of the reels and therefore subject the paper strips 27, 28, 29 and 30 to a somewhat constant tension throughout the operation of the machine.

Figure 5:
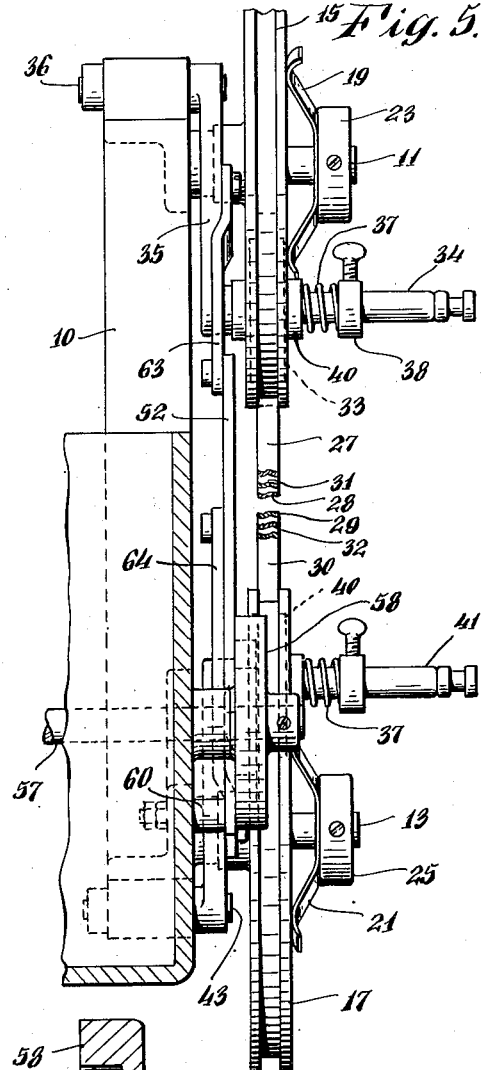
Fig. 5 is a vertical section in line 5—5 of Fig. 3.

In accordance with this invention the foil supply reels, such as 33 and 40, are mounted in such manner as to be displaceable in space, during a portion of the complete roll forming cycle of the machine, from a normal feeding position to a position in the direction of travel of the foil strips 31 and 32 and toward the winding mandrel and then back again to normal position. In the illustrated embodiment of a device permitting of such movement the supply reel 33 of foil strip 31 is rotatably mounted on a pin 34 which extends from an arm 35 (Figs. 4, 5 and 8). Arm 35 is mounted to oscillate about a pin 36 which extends from the front panel 10 so that the reel 33 may be rocked about pin 36 at its center periodically during the operation of the machine. Restraint is afforded to the free rotation of the foil reel 33 on the pin 34 by a spring 37 which is tensioned between an adjustably positionable collar 38 and the reel. The other side of the reel bears against a collar 39 which is staked to pin 34. The foil supply reel 40 is similarly mounted on a pin 41 which is carried by an arm 42 which is supported by a pin 43 so as to enable the arm and reel 40 to be rocked about the axis of pin 43 as a center.

Figure 6:
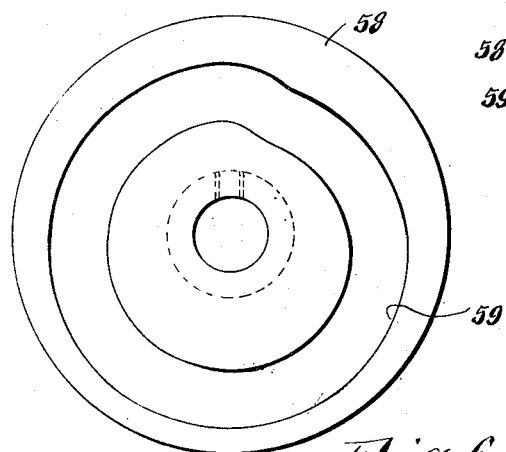
Fig 6 is a detail of the cam 58 shown in Fig. 3.
Figure 7:
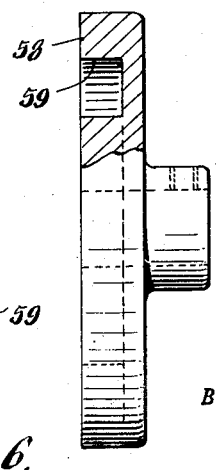
Fig. 7 is an edge view of the cam illustrated in Fig. 6.

The rocking of the foil supply reels 33 and 40 from their normal feeding position, as shown in full line in Fig. 3, to their forward, or foil slackening position, as shown in dotted line in Fig. 3, is controlled by the action of a cam 58, which cam is fixed on rotatable shaft 57 (Figs. 3, 6 and 7). This cam is provided with a cam groove 59, and arm 52, mounted on panel 10 for movement on fixed pivot pin 60, is provided with a roller 61 fixed to said arm and positioned within cam groove 59. The cam groove is so designed as to oscillate the arm 52 each time the cam is rotated one revolution. When the cam is at rest, arm 52 is held in the position illustrated in Fig. 3 with the foil reels in their most rearward position with respect to the indexing shaft 44.

The upper end of arm 52 is pivotally connected with the link 63 which is pivotally connected at its other end to arm 35 upon which the foil supply reel 33 is mounted. Arm 42, upon which the foil supply reel 40 is mounted, is connected to arm 52 by a link 64.

The cam 58 is driven at such speed and time as to relate the movement of the foil reels directly to the indexing of the winding mandrel from station A to station B and the beginning of the winding operations, because it is at these points that the movement of the cut foil supply ends out of the cutter box 84 and toward the winding station A is critical. To achieve such sequential movement, the cam shaft 57 is preferably driven in a one-to-one ratio with the indexing shaft 44, the rotation of which latter indexes mandrel turret 45. Such relationship of these driven parts may be achieved in various ways, an example being shown in Fig. 10. Since the mechanism of Fig. 10 is identical in essential operation to a portion of the driving mechanism of the machine shown in the aforesaid United States Patent No. 2,384,983, only so much thereof will be described as will illustrate the principle involved. Referring to Fig. 10, a power driven shaft 100 is provided with a worm 101 which drives a worm wheel 102 which is loosely rotatable on a shaft 103. Fastened on shaft 103 is a gear 104. Worm wheel 102 and gear 104 are provided with clutch parts (not completely shown) which are engaged, thereby driving shaft 103, when solenoid plunger 106 is withdrawn upwardly by the energizing of solenoid 105 (at the end of a winding operation at station A), and the clutch parts are disengaged when shaft 103 has completed one full revolution. Fixed on shaft 103 is a Geneva arm 107 having a pin 108 adapted to engage with the radially extending slots 109 of a Geneva plate 110 which is fixed on the indexing shaft 44 which carries the mandrel turret 45 (see Fig. 3). Also mounted and fixed to shaft 103 is a sprocket wheel 111 which drives a sprocket wheel 112, fixed to shaft 57, by chain 113, the gear ratio being one-to-one so that there is one revolution of shaft 57 for every revolution of shaft 103. Fastened on shaft 57 is an eccentric 114 on which rides a roller 115 journaled on the end of a bell crank arm 116, which arm is so related to a clutch (not shown) at winding station A that movement of said bell crank arm will start the winding operation. The eccentric 114 is so related to Geneva arm 107 as to start the winding operation soon after Geneva pin 108 has swept through a Geneva slot 109 to complete a 90° indexing movement of mandrel turret 45. Mounted on the opposite end of the shaft 57 (see Fig. 3) is the cam 58 which, as aforesaid, controls the back and forth movement of foil reels 33 and 40. It will thus be apparent that by proper positioning of cam 58 on shaft 57 the action of the cam, and consequently the movement of the foil reels, may be directly related to the action of the other elements which are actuated during the complete revolution of shaft 103. Shaft 103 begins its revolution at the end of the winding operation which takes place at station A and ends its single revolution some time after the beginning of the next succeeding winding operation at station A but before the foil strip cutting operation has taken place in cutter box 84 (all as more specifically described in the aforesaid Patent No. 2,384,983).

Referring now to the mechanism of the foil cutter box 84 and the position of the strips passing therethrough, this box contains (see Fig. 9) transverse pins 120 at its front, or strip entering, end and transverse pins 121 at its rear, or strip exit, end. Between these fixed pins 120 and 121 are strip guides 122. The pairs of transverse pins 120 exert a light pressure on the strips which are threaded therethrough, the pressure being sufficient to maintain at least portions of adjacent surfaces of the strips in frictional engagement with each other. The guides 122 are so shaped as to serve to by-pass the paper strips passing through box 84 around the action of two foil knives 123 and to guide the foil strips 31 and 32 directly through the cutting arc of these foil knives. It will now be noted that when knives 123 are rotated through their cutting arc to sever the foil strips 31 and 32, the severed foil portion which is attached to the mandrel will thereafter continue to advance, whereas the severed foil portion which is attached to the supply reels 33 and 34 will only advance if the friction between the surfaces of the foil strips and the surfaces of the paper strips passing between the transverse pins 120 is sufficient to overcome the backward pull exerted on the foil strips by the inertia of the foil reels 33 and 40. It will be evident that the reels 33 and 40 will cease rotation at the moment that foil knives 123 sever the foil strips 31 and 32. Therefore, until the inertia of foil reels 33 and 40 is overcome, i. e., so long as foil reels 33 and 40 are in normal feeding position, the space between the severed foil ends will be enlarged by the continued winding action of the winding mandrel at station A.

When a multi-mandrel winding machine is first put into operation the supply reels for both paper and foil are placed upon their axles and the strips of paper and foil are threaded in interleaved relation over and under guide pins 69 and 70 and threaded through the cutter box substantially as shown in Fig. 9. The paper strips are attached to the mandrel, the ends of the foil strips lying either in the cutter box or at a point between the cutter box and the mandrel.

Referring now to the upper portion of the chart of Fig. 11, and to the foregoing description of the machine, it will be noted that a full cycle of the machine involves, as the first step, the indexing of a wound roll from station A to station B; as the second step, the closing of the mandrel at station A to engage the paper strips now extending thereacross, followed by the severing of the paper strips by the knife 88; and, as a third step, a full winding operation at station A, the foil knives in cutter box 84 being actuated near the end of said winding operation to sever the foil strips. The cycle is then completed and is repeated any number of times.

In the preferred embodiment of my invention, as described herein, the cam groove 59 is so shaped (see Fig. 4) and the cam so positioned on shaft 57 that during the cycle just described the movement of position of the foil reels 33 and 40 will be as indicated on the middle portion of the chart of Fig. 11. As there shown, the foil reels will advance to provide slack foil as the indexing of the wound roll from station A to station B takes place. Advance of the foil reels will be halted during the time the new mandrel at station A is closed and the paper strips are cut. The advance of the foil reels will thereafter continue in the early part of the winding operation to provide further foil slack until the surface contact of the paper strips and the foil strips will have advanced the ends of the foil to the mandrel, and thereafter as the foil and paper strips are wound together around the mandrel, preferably a full turn or more, the foil reels will be returned to their normal feeding position, thus pulling the foil strips tight and providing tension therein. Thus the foil reels 33 and 40 will be at their normal position when foil knives 123 operate in cutter box 84 to again cut the foil, at which time the foil reels 33 and 40, restrained against rotation by spring 37, will exert sufficient force to hold the cut end of the foil supply against advancement when the winding mandrel, completing the operation at winding station A, opens up the space between the cut foil ends to the desired extent. It will be apparent that foil slackening may be delayed until the winding action of the mandrel has produced as many convolutions of paper on the mandrel as may be desired.

It will be apparent that the actuating means by which the foil reels are moved toward and away from the mandrel may take any convenient form and need not take the specific and preferred form just described. Various arrangements of mechanically cooperating parts may be effective to move the foil reels to provide slack, or non-tensioned foil, at predetermined intervals. Furthermore, it will be apparent to those skilled in the art that the principles herein described may be applied to various forms of machines adapted to the winding of electrical capacitor rolls.

Referring again to Fig. 11, the foil reel moving means may also be so adjusted as to continuously move the foil reels to provide slack over the entire portion of the cycle where slack foil is desirable. Such a result is shown in the lower portion of Fig. 11 where the foil reels are advanced continuously throughout that part of the cycle in which slack foil is needed. In another modification the foil reels may be advanced sharply at the beginning of the period in which foil slack is required to immediately provide all of the necessary slack and then may be held in that position until application of tension to the foil strips is desirable, at which time the reels will start their return to the normal feeding position. Such modifications as these may be selected according to the particular structure of the winding machine, the particular mode of operation thereof, and the pleasure of the operator.

The principle of displacing the foil reels forward during an operating cycle of a capacitor roll winding machine may be employed under any circumstance where the furnishing of slack foil, or relief from foil tension caused by the inertia of the foil supply reel, may be desirable. For instance, the machine of United States Patent No. 2,384,983 provides separate strip advancing means which operate on the strips at a point between the strip supply rolls and the mandrel to furnish slack in all of the strips at described stages of the machine's operation. While, as above stated, I desire to eliminate such positive strip advancing means because of the propensity of the same to injure very thin paper or foil strips such as are of the order of .0001" in thickness, nonetheless when such means are employed, the broad principles of this invention may be used in connection therewith to furnish slack foil between the point of foil supply and the positive strip advancing means.

Having thus described my invention, I claim:

1. In a strip winding machine including a winding mandrel, means for operating said mandrel, sources of insulating strips positioned to furnish insulating strip to said mandrel and at least one rotatably mounted reel adapted to contain and furnish metallic foil strip to said mandrel in interleaved relation with said insulating strips, a movable mounting for said foil reel and means for moving said mounting toward and away from said mandrel during selected stages of the operation of said machine.

2. In a strip winding machine including a winding mandrel, means for operating said mandrel, sources of insulating strips positioned to furnish insulating strip to said mandrel and at least one rotatably mounted reel adapted to contain and furnish metallic foil strip to said mandrel in interleaved relation with said insulating strips, a movable mounting for said foil reel and means for moving said mounting toward and away from said mandrel during selected stages of the operation of said mandrel.

3. In a winding machine, a mandrel support, a rotatable mandrel mounted on said support, an indexing shaft for rotating said support to advance said mandrel a predetermined distance, a rotatably mounted reel for supplying an insulating strip to said mandrel, a rotatably mounted reel for supplying a conducting strip to said mandrel, means supporting said conducting strip reel for enabling its movement towards and from said mandrel support, and means operable to move said supporting means to produce slack in the conducting strip during the advance of said mandrel.

4. In a winding machine, a mandrel support, a rotatable mandrel mounted on said support, an indexing shaft for rotating said support to advance said mandrel a predetermined distance, rotatably mounted reels for supplying insulating strips to said mandrel, at least one rotatably mounted reel for supplying foil to said mandrel, means including a pivoted arm supporting said foil supply reel for enabling movement of the foil supply reel towards and from said mandrel support, and means for oscillating said pivoted arm to change the position of the foil reel relative to the position of said mandrel during the rotation of said support.

5. In a strip winding machine, a winding mandrel, means to operate said mandrel at predetermined intervals, rotatably mounted supply reels for furnishing insulating strips and metallic foil strips in interleaved relation to said mandrel, means for cutting said foil strips positioned intermediate said foil supply reels and said mandrel, means for operating said cutting means, movable mountings for said foil supply reels, means connected to said movable mounting and operable to normally maintain said foil reels in normal foil feeding position, to advance said foil reels from said normal position toward said mandrel and to thereafter return said foil reels to said normal position, and timing means adapted to actuate the mandrel operating means, the foil cutting operating means and the means connected to said movable foil reel mounting.

6. In a strip winding machine, in combination, a winding mandrel, means for operating said mandrel, rotatably mounted supply reels for furnishing insulating strips and metallic foil strips in interleaved relation to said mandrel, foil strip cutters positioned intermediate said mandrel and the foil supply reels, means for operating said cutters, movable mounting for said foil supply reels, means connected to said movable mounting and operable to position said foil reels in a normal foil feeding position, to advance said foil reels toward said mandrel and to return said foil reels to said normal foil feeding position, and timing means adapted to actuate the mandrel operating means, the foil cutter operating means and the said means connected to the movable foil mounting in predetermined relationship.

7. In a strip winding machine, in combination, a winding mandrel, means for operating said mandrel, rotatably mounted supply reels for furnishing insulating strips and metallic foil strips in interleaved relation to said mandrel, foil strip cutters positioned intermediate said mandrel and the foil supply reels, means for operating said cutters, movable mounting for said foil supply reels, means connected to said movable mounting and operable to position said foil reels in a normal foil feeding position, to advance said foil reels toward said mandrel and to return said foil reels to said normal foil feeding position, and timing means adapted to actuate the mandrel operating means, the foil cutter operating means and the said means connected to the movable foil mounting in predetermined relationship whereby the said foil supply reels are advanced toward the mandrel during an initial portion of mandrel operation and returned to normal foil feeding position prior to the operation of said foil cutters.

8. In a machine for winding a succession of capacitor rolls, a rotatable mandrel support, a plurality of rotatable mandrels mounted on said support, a mandrel drive, means for indexing said support to move successive mandrels into engagement with said drive, a plurality of rotatable reels for supplying insulating strips and for supplying metallic foil strip to a mandrel, said reels being positioned to supply said strips in interleaved relation, foil strip cutters positioned intermediate said reels and said mandrel support, means positioned intermediate said cutters and said reels to maintain the surfaces of the interleaved strips in frictional engagement, timed operating means adapted to index a mandrel into driving position, to begin the winding action of said mandrel, to operate said cutters, and to stop the winding operation of the mandrel in the sequence indicated, movable mounting for said foil supply reels, means for moving said mounting toward and away from said mandrel, said means being so related to said timed operating means that said foil supply reels are moved toward said mandrel as the mandrel is indexed to driving position and is moved away from said mandrel after the beginning of the winding action and before the operation of said cutters.

9. In a winding machine of the type which includes a mandrel, means for operating said mandrel, a plurality of supply reels of insulating strip and of metallic foil strip rotatably mounted and positioned to deliver under the winding action of said mandrel insulating strips and foil strips in interleaved relation, cutters disposed intermediate said mandrel and said reels and operable to perform a cutting operation on said foil strips at a predetermined time during the winding action of said mandrel, and means for positioning the adjacent surfaces of the interleaved strips in frictional engagement at a point intermediate said cutters and said reels, the improvement consisting of at least one foil supply reel mounted for movement toward and away from said mandrel and means for moving said reel from a normal foil feeding position away from said mandrel to a position toward said mandrel and back to said normal position at predetermined times with relation to the winding action of said mandrel and the operation of said cutters.

FELIX WEISS.

No references cited.